July 16, 1929.  A. G. ROYLE  1,721,233
TWIN STRAINER AND VALVE FOR WATER MAINS AND THE LIKE
Filed Nov. 19, 1927  2 Sheets-Sheet 2

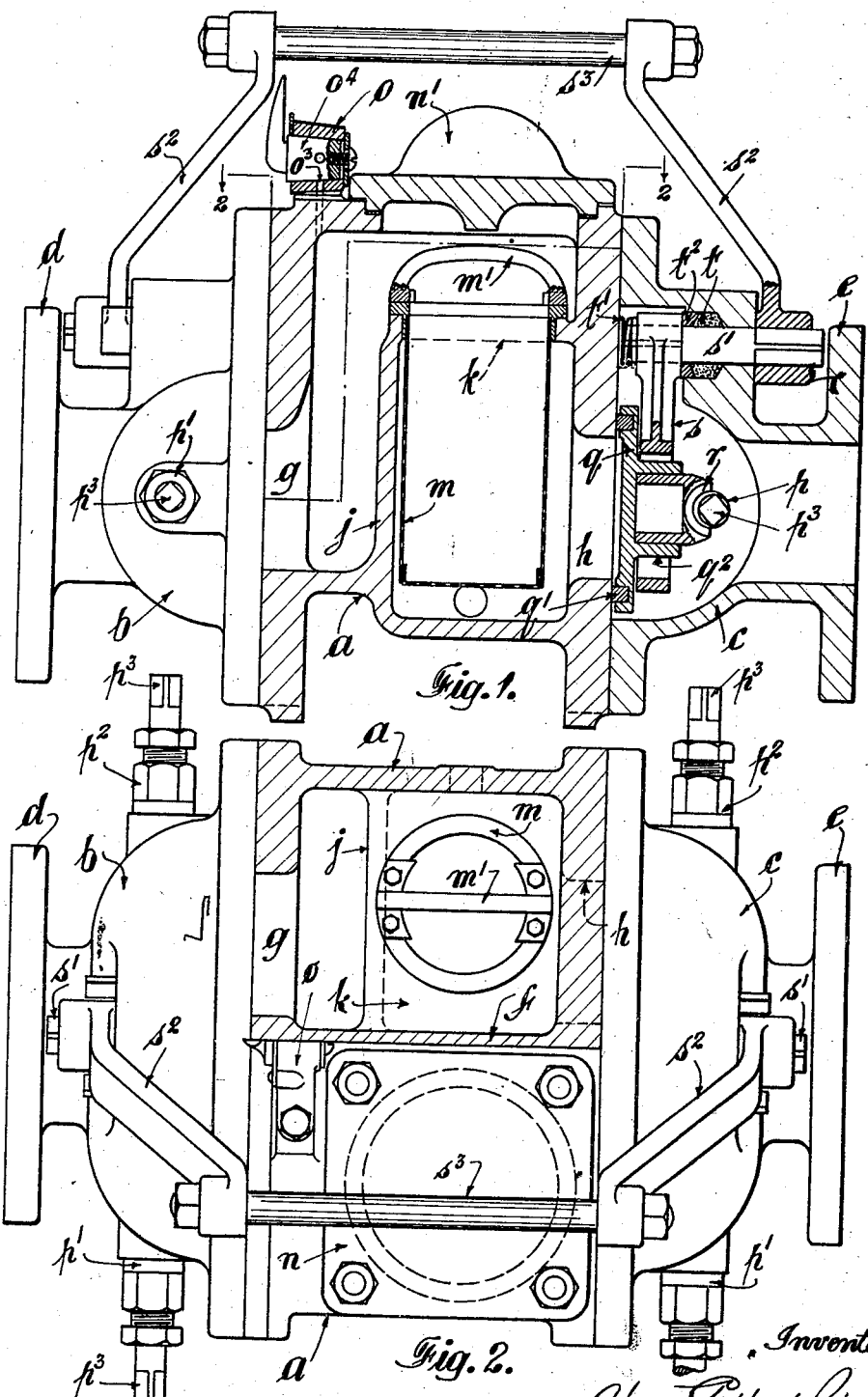

Inventor:
Alan Gilbert Royle.
By his Attorney: Walter Gunn

Patented July 16, 1929.

1,721,233

UNITED STATES PATENT OFFICE.

ALAN GILBERT ROYLE, OF IRLAM, NEAR MANCHESTER, ENGLAND.

TWIN STRAINER AND VALVE FOR WATER MAINS AND THE LIKE.

Application filed November 19, 1927, Serial No. 234,508, and in Great Britain May 13, 1927.

This invention refers to what are termed "twin" strainers and valves for filtering and straining water and other liquids and of the kind having two strainers and flow controlling means, whereby the water or other liquid may continue uninterrupted through either strainer the other being cut off and removable for cleaning.

One of the objects of this invention is to provide a construction of "twin" strainer and valve mechanism therefor suitable for relatively high pressures while keeping down the cost of manufacture. A further object is to provide an arrangement of valve-operating mechanism which allows of quicker adjustment of the valves than the mechanism hitherto employed, and to provide with such valve-operating mechanism means for holding the valves to their seatings against the pressure of the liquid tending to push them away from their seatings. Another object of the invention is to provide a vent or equalizing valve whereby the pressures on opposite sides of the valves may be equalized when the valves require to be opened, thus making it easier to open same, the said vent also being available for allowing of any discharge of vapour etc. from the interior of the strainer.

According to the invention the improved strainer comprises a casing, a valve chamber at each end of the casing, a pipe connection to each valve chamber, two strainer passages between the valve chambers, a strainer in each passage, a disc-like valve in each valve chamber adapted to cover either of the two passages, an operating lever engaging the two valves to move them simultaneously into position over either of the said passages and means for applying pressure to the said valves to seal the passage. A further feature of the invention consists in providing means for equalizing the pressures on both sides of the valves to facilitate their operation.

The accompanying drawings illustrate the preferred form of the invention, in which :—

Fig. 1 is a sectional elevation.

Fig. 2 is a part sectional plan on line 2—2, Fig. 1.

Figures 4, 5:
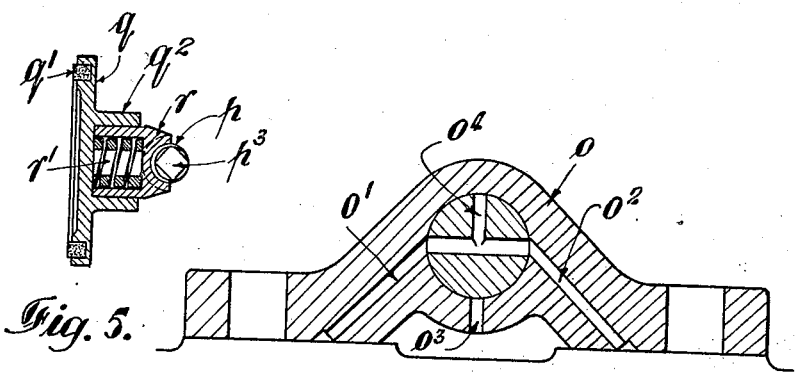

Fig. 4. is an enlarged sectional elevation showing the pressure balancing valve for the main valve.

Fig. 5. is a sectional elevation of a valve and the mechanism for applying pressure thereto.

As illustrated, the improved strainer comprises a casing consisting of a central portion $a$ and end covers $b$ and $c$, each ends of the central portion being machined flat to act as a valve face and to receive its cover, the latter forming valve chambers and being provided with flanges or pipe connections $d$ and $e$ respectively for the inlet and outlet. In the central portion are two compartments separated by a partition $f$ and forming the two passages. Each compartment has an inlet opening $g$ and an outlet opening $h$ between which is a separation wall formed by a vertical partition $j$ rising from the floor of the compartment and joining at its top with a horizontal partition $k$ in which is a relatively large circular aperture for a removable strainer basket $m$ having a hand $m^1$. The compartments are provided with covers $n$, $n^1$ respectively, while between the compartments and secured to the body of the central portion is a triangular shaped bracket $o$ having inclined passages $o^1$, $o^2$ and outlet $o^3$ leading to a three-way plug cock $o^4$. The bracket is secured to a machined facing on the central portion of the casing, immediately over the inlet openings $g$, passages $o^5$ and $o^6$, the latter not shown, being provided registering with the inclined passages $o^1$, $o^2$ and communicating directly with the two compartments. The three-way plug cock is of ordinary construction with one through diametrical passage and one radial one at right angles thereto meeting it in the centre.

The value mechanism proper for the strainer is the same at each end, the two valves being arranged for simultaneous operation by a common operating means, and is as follows: In each end cover is arranged a valve guide rod extending across the valve chamber to be in front of the inlet or outlet openings respectively in the central portion of the casing. Such valve guide rod $p$ is eccentrically mounted in glands $p^1$, and $p^2$ and arranged at each end with a squared portion $p^3$ for a key so that it may be turned from either end. Each valve $q$ is disc-shaped, having an inlaid circular facing $q^1$ and at the back a central hollow upstanding boss $q^2$ in which is slidably mounted a guide and pressure member $r$ with spring $r^1$, the end of the plug having a transverse groove of semi-circular section to engage the guide rod $p$. The valve operating mechanism consists of a forked operating lever $s$ mounted on the squared inner end of a spindle $s^1$ rotatably mounted in the end cover, on the outer squared end of which spindle is a further lever $s^2$, the two free ends of the levers $s^2$ from each end cover being connected by an operating bar $s^3$. A gland packing $t$ is provided at the spindle $s^1$ and the required pressure to maintain a tight joint is obtained by means of a spring $t^1$ behind the forked lever $s$ and a gland collar $t^2$, the spindle $s^1$ being free to slide and rotate but confined between the end face of the central portion $a$ and the back face to the flanges $e$ and $d$ respectively. The spring $r^1$ is optional and may be omitted if desired.

Figure 3:
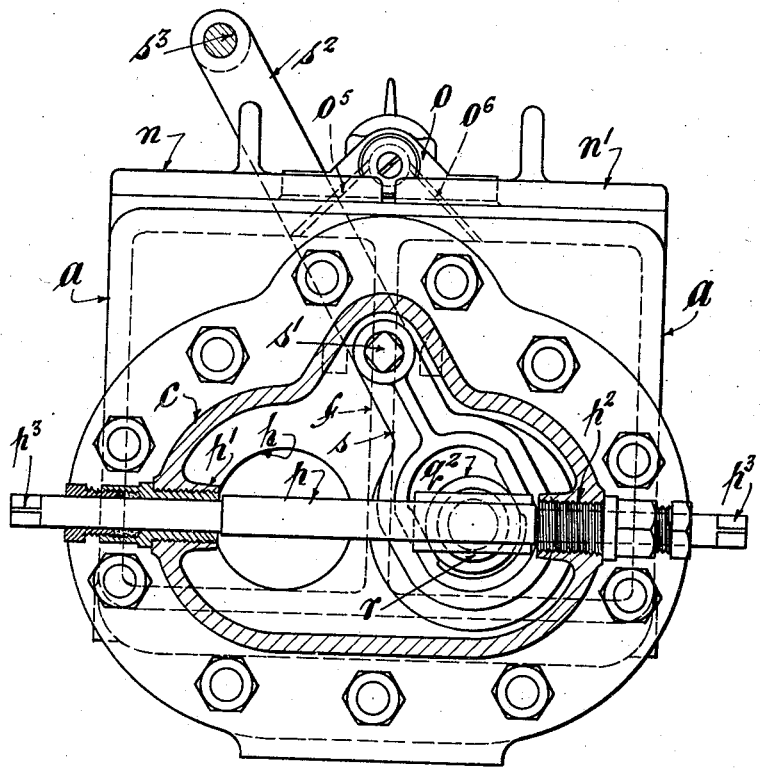
Fig. 3 is a sectional end elevation showing a valve chamber and the valve operating mechanism.

In operation, the valves are shown closing one of the passages, and the strainer in the other passage may be removed for cleaning by removing its cover $n^1$. Incidentally, it will be noticed that the operating bar $s^3$ lies over the cover $n$ and so acts as an indication to prevent removal of the wrong cover. To change over to operation on the other passage, after first ascertaining that the cover $n^1$ is secure the pressure on the valves is released by turning the eccentric guide rods $p$ when the valves may be moved across by pulling or pushing over the operating bar $s^3$ to its alternative extreme position. The covers are then secured in their alternative positions by turning the eccentric guide rods $p$. The operation of the change over is facilitated by means of the plug cock $o^4$ which may be turned first to the vertical position shown in Figs. 3 and 4 when the water will enter from the passage in use and establish a balancing pressure within the closed chamber allowing the valves to be moved easily from their seatings. Also, before opening the compartment to clean the strainer, the plug cock may be turned over towards the cover which it is intended to remove, thereby opening the passage $o^1$ or $o^2$ to the outlet $o^3$ and releasing any pressure in the compartment. A dial may be provided to enable the operator to see which way to turn the plug cock.

The constructional details of the invention are obviously open to modification without departing from the nature of the present invention, the essential features of which are in the provision of means for simultaneous movement of the two valves and means for applying the required seating pressure.

What I claim is:—

1. An improved strainer comprising a casing, a valve chamber at each end of the casing, a pipe connection to each valve chamber, two strainer passages between the valve chambers, a guide rod eccentrically mounted in each valve chamber, a disc-like valve in each chamber slidably mounted on the rod and adapted to cover either of the two passages, operating means engaging the two valves to move them simultaneously into position over either of the said passages and means for rotating the guide rod to apply pressure to the said valves to seal the passage.

2. An improved strainer comprising a casing consisting of a central portion and two end covers, a valve chamber in each end cover, a pipe connection to each end cover, a machined valve face at each end of the said central portion, two passages in the central portion opening to the said valve faces, a removable strainer in each passage, a guide rod eccentrically mounted in each valve chamber and adapted to be turned, a disc-like valve slidably mounted on each rod, an operating lever in each valve chamber, a common handle connecting the two operating levers for simultaneous operation of the two valves, and means for turning the guide rod to apply pressure to the valves to seal the passage.

3. An improved strainer comprising a casing, a valve chamber at each end of the casing, a pipe connection to each valve chamber, two strainer passages between the valve chambers, a guide rod eccentrically mounted in each valve chamber, a disc-like valve in each chamber slidably mounted on the rod and adapted to cover either of the two passages, a valve-controlled bye-pass passage between the two passages, to balance or release the pressures within the passages, operating means engaging the two valves to move them simultaneously into position over either of the said passages and means for turning the guide rods to apply pressure to the said valves to seal the passage.

4. An improved strainer comprising a casing consisting of a central portion and two end covers, a valve chamber in each end cover, a pipe connection to each end cover, a machined valve face at each end of the said central portion, two passages in the central portion opening to the said faces, a removable strainer in each passage, a valve-controlled bye-pass passage between the two said passages with release outlet, an eccentrically mounted guide rod in each valve chamber adapted to be turned, a disc-like valve slidably mounted on each rod, an operating lever in each valve chamber, a common handle connecting the two operating levers for simultaneous operation of the two valves, and means for turning the guide rod to apply pressure to the said valves to seal the passage, as set forth.

In testimony whereof I have signed my name to this specification.

ALAN GILBERT ROYLE.